United States Patent
Ali (10) Patent No.: US 11,497,254 B1
(45) Date of Patent: Nov. 15, 2022

(54) SYSTEM AND METHOD FOR AUTHENTICATING AN ELECTRONIC VAPING DELIVERY UNIT

(71) Applicant: Rasheed Ali, Hollywood, FL (US)

(72) Inventor: Rasheed Ali, Hollywood, FL (US)

( * ) Notice: Subject to any disclaimer, the term of this patent is extended or adjusted under 35 U.S.C. 154(b) by 500 days.

(21) Appl. No.: 16/656,649

(22) Filed: Oct. 18, 2019

Related U.S. Application Data (60) Provisional application No. 62/816,514, filed on Mar. 11, 2019.

(51) Int. Cl.
| | |
|---|---|
| *A24F 47/00* | (2020.01) |
| *A24F 40/60* | (2020.01) |
| *G06Q 30/00* | (2012.01) |
| *A24D 3/17* | (2020.01) |
| *A24F 40/00* | (2020.01) |

(52) U.S. Cl.
CPC ............... *A24F 40/60* (2020.01); *A24D 3/17* (2020.01); *A24F 40/00* (2020.01); *G06Q 30/0185* (2013.01)

(58) Field of Classification Search
CPC ............................ A24F 40/60; G06Q 30/0185
See application file for complete search history.

(56) References Cited

U.S. PATENT DOCUMENTS

| | | | | |
|---|---|---|---|---|
| 2015/0366268 A1* | 12/2015 | Shabat | ................... | G06F 13/382 |
| | | | | 131/329 |
| 2017/0042252 A1* | 2/2017 | Takeuchi | ................. | A24F 40/53 |
| 2020/0397048 A1* | 12/2020 | Wang | ...................... | A24F 40/51 |
| 2021/0093011 A1* | 4/2021 | Moloney | .................. | A24F 40/46 |
| 2021/0401061 A1* | 12/2021 | Davis | ...................... | A24F 40/57 |

FOREIGN PATENT DOCUMENTS

WO   WO-2020132127 A1 *  6/2020   ............. A24F 40/42

* cited by examiner

*Primary Examiner* — Eric Yaary
(74) *Attorney, Agent, or Firm* — Malloy & Malloy, P.L.

(57) ABSTRACT

A system and method for authenticating an electronic vaping delivery unit. The system comprises: a double-sided insert disposable onto a container, a device operatively configured with a data network, and a user interface operatively linked to the device. The double sided insert comprises a front side and a reverse side. The front side comprises a first identifier and the reverse side comprises a second identifier. The reverse side and the second identifier are concealed when the double sided insert is deposed against the container. The front side and the second identifier are exposed when the double-sided insert is removed from the container. The user interface is configured to allow access to a user upon a successful recognition of the first identifier. The user interface is further configured to generate an authenticating confirmation upon a successful recognition of the second identifier.

22 Claims, 6 Drawing Sheets

SYSTEM AND METHOD FOR AUTHENTICATING AN ELECTRONIC VAPING DELIVERY UNIT

CLAIM OF PRIORITY

The present application claims the domestic benefit, pursuant to 35 U.S.C. § 119(e) to U.S. Provisional Patent Application 62/816,514 filed on Mar. 11, 2019, the contents of which are incorporated herein, by reference, in their entirety.

BACKGROUND OF THE INVENTION

Field of the Invention

The present invention relates to a system and method for authenticating an electronic vaping product.

Description of the Related Art

Traditionally, various types of codes have been used in connection with a variety of products, including for tracking purposes. However, there are various drawbacks associated the ways in which codes have traditionally been used. For example, it is generally difficult to prevent the unauthorized reproduction of codes, such as by bootleggers. Codes are often the subject of theft and may later be used in connection with illegitimate replicas and counterfeit products. For example, bar codes are typically printed on tickets for concerts, sporting events, and other events, but such printed codes may easily be copied as they are generally visible. Additionally, the way in which codes are generally used does not allow an end user to "close the loop" between the intended recipient and the product itself. For example, the use of codes generally does not contemplate associating information about the purchaser with the product itself. Furthermore, the use of codes in connection with electronic vaping products is relatively limited. Some believed to exist methods of using codes are susceptible to theft because the codes may be easily replicated. For example, holograms, hardware signatures, barcodes, and serial numbers, may be easily replicated. Other examples include consumable codes, such as those that may be used in connection with software licenses. However, none of these believed to exist codes and corresponding methods implement a verification process that effectively prevents the unauthorized replication of codes. As a result, it becomes relatively easy to manufacture illegitimate replicas of a product, often times in mass quantities, and according to the same specifications as the authentic product.

Accordingly, there is a need in the industry for a cost effective solution that would overcome the foregoing drawbacks. The industry would benefit by providing a system and corresponding method of authenticating electronic vaping products that would essentially "close the loop" between the purchaser and the electronic vaping product itself. A further benefit would be realized by providing a system and corresponding method, that implements suitable hardware and software to recognize specific identifiers or codes linked with a legitimate electronic vaping product. An even further benefit would be realized if such a system and corresponding method would generate an authentication confirmation after a successful recognition of the identifier or code linked with an electronic vaping product.

SUMMARY OF THE INVENTION

A. Overview of System

The present invention is directed to a system for authenticating an electronic vaping delivery unit. The inventive system generally comprises a device(s) that is operatively configured with a data network to permit a user to access the various features of the present invention. As will be described in more detail later, the system according to the present invention further comprises a double-sided insert that may be used in connection with authenticating an electronic vaping delivery unit. The double-sided insert may be disposed on the surface of a container that will transport one or more of electronic vaping delivery units. As used herein, an "electronic vaping delivery unit" refers to one or more cartridges, vials, or casings, wherein each one is configured for operation with an electronic vaping device.

The double-sided insert generally comprises a front side and a reverse side. Generally, the front side comprises a first identifier, and reverse side comprises a second identifier. The first and/or second identifier may comprise a key or a code, which may be a series of numerals, or a scannable element, such as a bar code. An individual identifier should be associated with a specific electronic vaping delivery unit, such that it may not be associated with a different electronic vaping delivery unit. Accordingly, it is within the scope of the present invention that each individual identifier comprises a unique key or code that may not be replicated. The double-sided insert is intended to be disposed on the surface of a container such that the front side faces away from the container and the reverse side faces towards the container. When the double-sided insert is disposed on the container, the reverse side should be concealed, and the front side should be exposed. When the double-sided insert is disposed on the container, the second identifier should also be concealed.

Features of the present invention providing a data network operatively configured with a device(s) to authenticate an electronic vaping delivery unit. The data network may be operatively configured with software and/or hardware components to enable an operative communication with the device(s) and to implement various features of the present invention. Additionally, the system according to the present invention may also include an application server with at least one computer with appropriate hardware and/or software to enable server capabilities.

Further features of the system according to the present invention comprise providing a user interface. Generally, the user interface is operatively linked to the device(s) and is configured to implement various features of the present invention, including allowing a user access to authenticate an electronic vaping delivery unit. The user interface may be implemented via an application, software, a web or mobile browser, or other suitable computer program that enables user communication and/or visualization of information. Accordingly, the user interface and/or a device(s) may be cooperatively configured with executable or interpretable computer code and/or hardware to recognize the first and/or second identifier and/or container that will transport one or more of electronic vaping delivery units. As used herein, a successful "recognition" of the first and/or second identifier and/or container that will transport one or more of electronic vaping delivery units refers to a successful verification that the identifier(s) and/or container is an appropriate match of a specific identifier(s) and/or container assigned or linked to a specific electronic vaping delivery unit(s). A user may manually input into the user interface a numeric code associated with the first and/or the second identifier. A user may also use and scan a barcode of the first and/or second identifier. A user may further also image, image using three dimensional imaging or video-record the container that will transport one or more of electronic vaping delivery units. Furthermore, a computer program may be implemented to recognize the first and/or second identifier, for example, after the identifier(s) has been manually inputted or scanned. Even furthermore, a computer program may be implemented to recognize the container that will transport one or more of electronic vaping delivery units, for example, after the container has been imaged, using three dimensional imaging, or video record. It is within the scope of the present invention that at least upon a successful recognition of the first identifier, that the user be permitted access to various features of the present invention. It is also within the scope of the present invention that in at least some embodiments, at least upon a successful recognition of the container, that the user be permitted access to various features of the present invention.

Yet additional features of the system according to the present invention comprise using the user interface to display data associated with an electronic vaping delivery unit. Upon a successful recognition primarily of the first identifier or "tracer" code, the user interface may display data associated with a specific electronic vaping delivery unit. It is within the scope of the present invention that such information may assist the user in making a purchasing decision. For example, information associated with the electronic vaping delivery unit may comprise data relating to the location of origin of the product, details about the manufacturer, date of manufacture, date of transport or shipment, and/or other data, such as, but not limited to, specific constituents and quantities associated with the electronic vaping delivery unit. Upon a successful recognition of at least the first identifier, a user may access the user interface to input certain information, including the individual's name, date of birth, gender, and/or purchasing preferences. Such information may be stored in a repository or electronic database.

The user interface should also be able to retrieve and/or display certain information about the electronic vaping delivery unit, including information that may assist the user in making a purchasing decision. One means of retrieving and/or displaying such certain information may be imaging, using three dimensional imaging, or video recording, the container that will transport one or more of electronic vaping delivery units. The user interface may then be able to utilize either image recognition software or object recognition software to successfully recognize the container. The user interface may then match the recognized container with a correct container stored on a database corresponding to the correct container. After purchasing an electronic vaping delivery unit, a user will generally have access to, and be able to expose, the second identifier. Upon a successful recognition of the second identifier, a user may use the user interface to generate an authentication confirmation. The authentication confirmation may be sent to the user or to another individual, including via email or text message. Additionally, the user interface may be configured to display the authentication confirmation directly on the device(s). The authenticating confirmation may comprise information relating to the manufacturer, distributor, and/or retailer of the electronic vaping delivery unit, or information relating to specific standards associated with the manufacture of the electronic vaping delivery unit. The authenticating confirmation may also give and/or send information to the application server that may further be used for analysis. Such analysis could include, but is not limited to, tracking and/or deducing associated attributes of any information given and/or sent for regulatory, business, or accounting purposes. The user interface may also be configured to generate and/or send a certificate of authenticity given and/or sent to the user upon a successful verification of the second identifier.

Even additional features of the present invention comprise implementing safety procedures intended to reduce the risk that certain information associated with an electronic vaping delivery unit be stolen. The user interface may be configured to invalidate the second and/or first identifier upon a successful recognition of the second identifier. As used herein, the terms "invalidate" or "invalidating" refer to an inactivation or otherwise dissolution of the second and/or first identifier. Inactivating the second and/or first identifier is intended to safeguard against the unauthorized manufacture of an electronic vaping delivery unit. Additionally, inactivating the second and/or first identifier is also intended to lower the likelihood that such identifiers are replicated and used in connection counterfeit products or unauthorized replicas.

B. Overview of Method

The present invention is also directed towards a method of authenticating an electronic vaping delivery unit. The method comprises providing: a double-sided insert disposed on a container, a device operatively configured with a data network, and a user interface operatively linked to the device. The double-sided insert comprises a front side and a reverse side. The front side comprises a first identifier, whereas the reverse side comprises a second identifier. The reverse side is disposed on a surface of the container such that the second identifier is concealed. The method further comprises removing the double-sided insert from the container to expose the second identifier.

The method according to the present invention further comprises allowing the user access to the user interface upon a successful recognition of the second identifier. The method may further comprise using the user interface to invalidate the second identifier upon a successful recognition of the second identifier. The method may alternatively comprise invalidating the first identifier upon a successful recognition of the second identifier. The method may further comprise using the interface to recognize the container. The method may further comprise using the user interface to generate and/or send an authentication confirmation upon a successful recognition of the second identifier. The method may further comprise having the user interface give and/or send information to a user interface server for further processing of such information. The method may further comprise using the user interface to generate and/or send an appreciation email upon a successful recognition of the second identifier.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As schematically represented in the accompanying drawings, the present invention is generally directed to a system and corresponding method for authenticating an electronic vaping delivery unit.

A. Overview of System

Figure 1A:
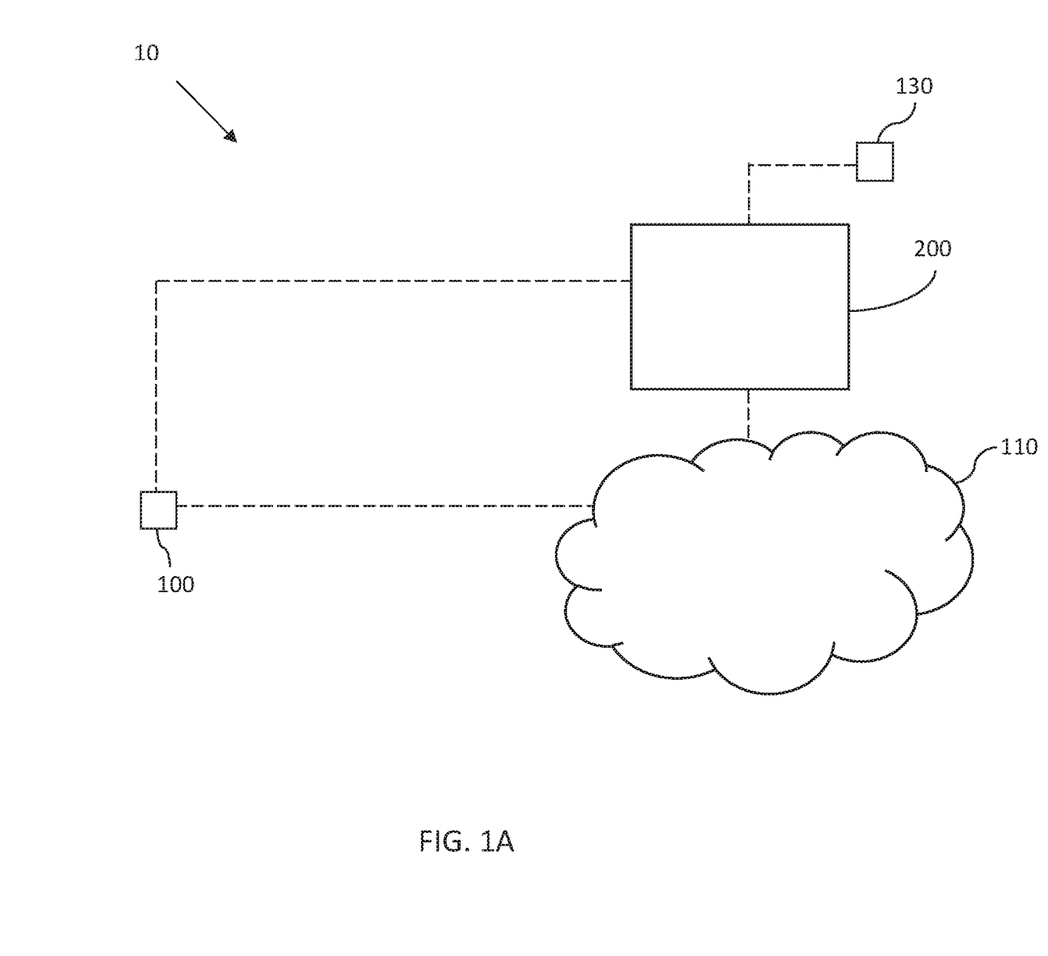
FIG. 1A is a diagrammatic representation of one illustrative embodiment of a system according to the present invention.
Figure 1B:
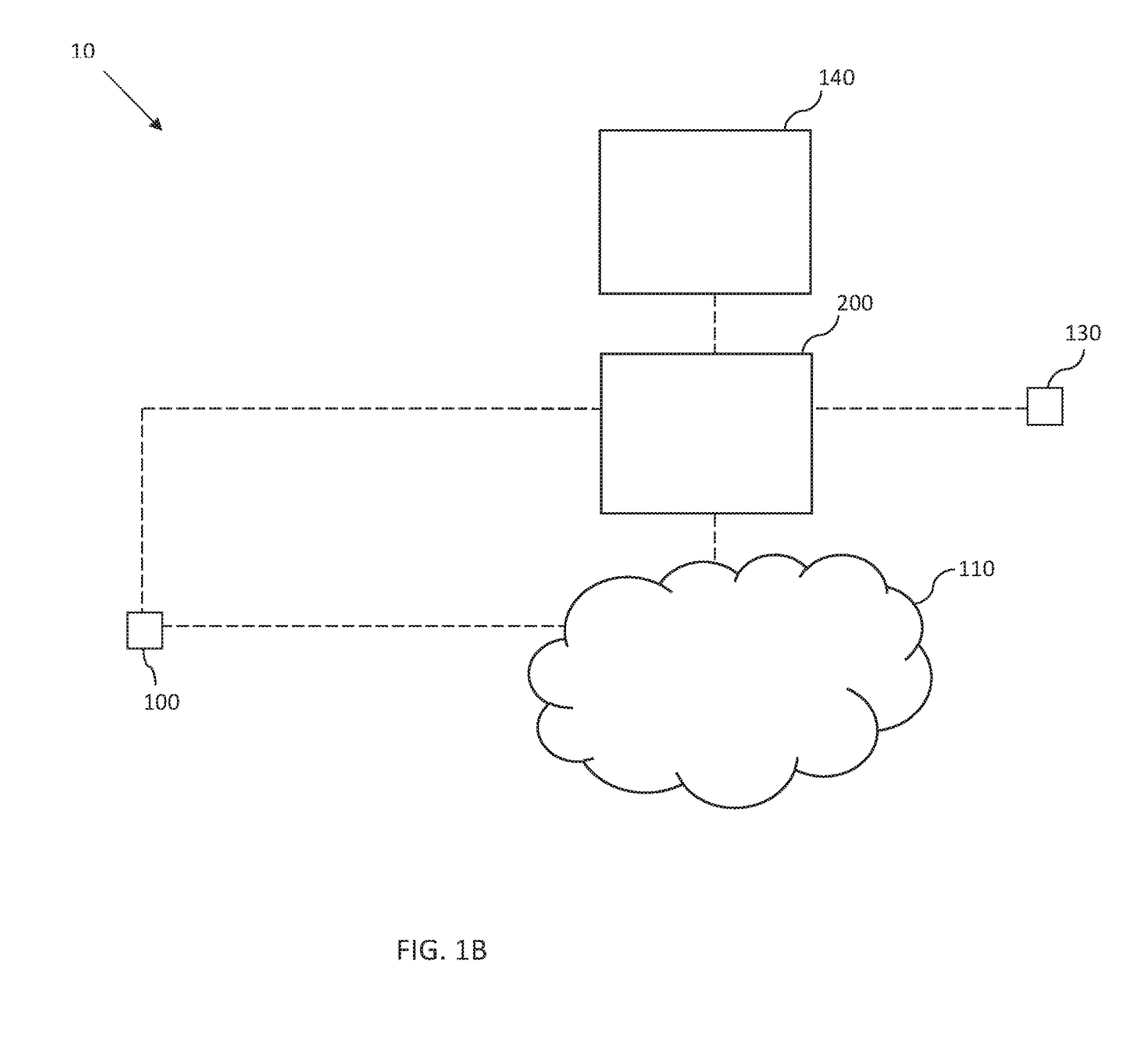
FIG. 1B is a diagrammatic representation of another illustrative embodiment of a system according to the present invention comprising an electronic database.

The present invention is directed to a system 10 for authenticating an electronic vaping delivery unit. The system 10 of the present invention may be implemented as is generally represented in FIG. 1A, and may also be implemented as is represented in FIG. 1B. The system 10 according to the present invention generally comprises at least one device 100 operatively configured with a data network 110. The device 100 is generally configured to permit a user(s) access to the various operative features of the present invention, including to authenticate an electronic vaping delivery unit. It is within the scope of the present invention that more than one device 100 be provided according to the specific need. The device 100 may be configured for remote access, and may be, but is not necessarily limited to, a mobile device, a laptop computer, a tablet, a portable computer, or a wearable electronic device. The device 100 may also comprise a desktop or other similar computer, or any other related device configured to communicate with a server or network, such as the data network 110. The system 10 according to the present invention may comprise software on a chip embedded or integrated into the device 100 to perform the functionalities described herein.

As represented in FIGS. 1-3B, the system 10 according to the present invention further comprises a double-sided insert 130, which is generally used for authenticating the electronic vaping delivery unit. The double-sided insert 130 is intended to be disposed on a surface 122 of a container 120. As used herein, the term "container" generally refers to a packaged enclosure, vessel, bottle, flask, or related component, suitable for retaining, storing and/or transporting the electronic vaping delivery unit. The container 120 may comprise a variety of shapes and sizes according to the number of the electronic vaping delivery units that it is intended to carry. As used herein, an "electronic vaping delivery unit" refers to a cartridge, vial, or casing that may be configured to operate primarily with an electronic vaping device, including, but not limited to an electronic cigarette. An "electronic vaping delivery unit" may also refer to a plurality of cartridges, vials, or casings, where each one is configured for operation with an electronic vaping device. The electronic vaping delivery unit generally comprises a predetermined amount of an active component, which may be a liquid and/or an oil and/or a concentrate and/or a tincture and/or a syrup and/or a glycerin and/or an alcohol and/or an herb and/or a solid which may comprise nicotine, or cannabinoids, including, but not limited to cannabidiol (CBD), or other related constituents intended for consumption via an electronic vaping device.

Figure 2:
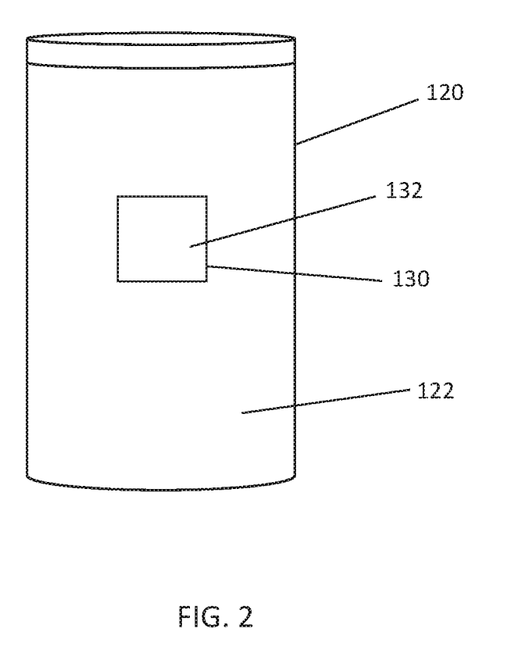
FIG. 2 is a perspective view of one illustrative embodiment of a double-sided insert of a system according to the present invention, the double-sided insert being disposed on a container.
Figure 3A:
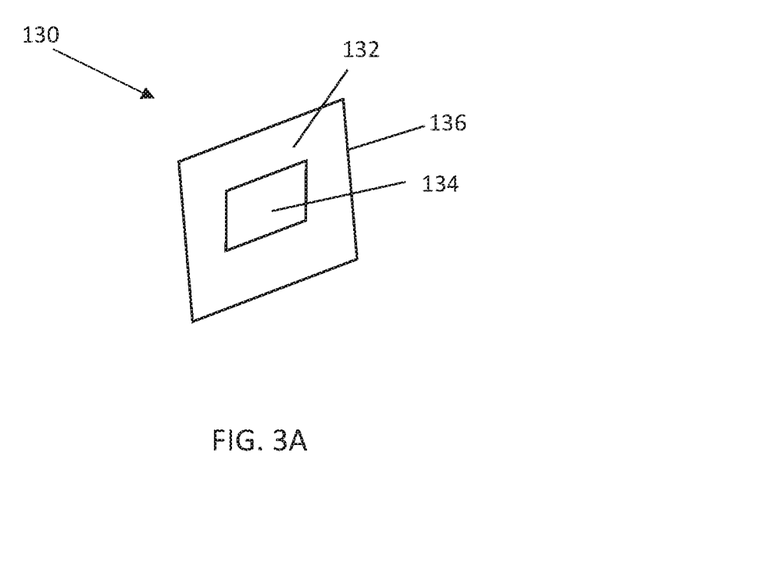
FIG. 3A is a front perspective view of one illustrative embodiment of a double-sided insert of a system according to the present invention.
Figure 3B:
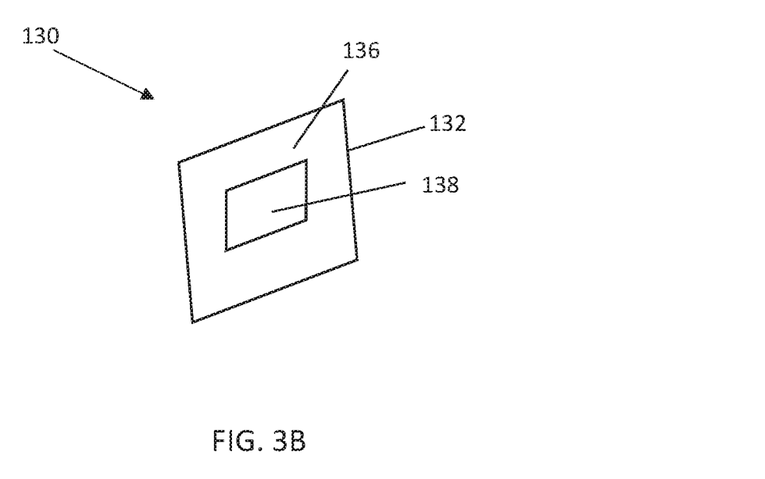
FIG. 3B is a rear perspective view of the illustrative embodiment as shown in FIG. 3A.

With reference to FIGS. 2 and 3A, the double-sided insert 130 comprises a front side, which is shown as 132. As shown in FIG. 3B, the double-sided insert 130 also comprises reverse side 136. The front side 132 of the double-sided insert 130 generally comprises a first identifier 134. The reverse side 136 of the double-sided insert 130 generally comprises a second identifier 138. The first identifier 134 and/or second identifier 138 may comprise a key or a code, which may be a series of numerals, or a scannable element, such as a bar code or related component. It is within the scope of the present invention, that the first identifier 134 and/or second identifier 138 comprise a code that is uniquely associated with a specific electronic vaping delivery unit. For example, in one embodiment of the system 10 according to the present invention, the first identifier 134 and the second identifier 138 be associated with only one specific vaping delivery unit, such that they may never be associated with a different electronic vaping delivery unit. It is within the scope of the present invention that the first identifier 134 and/or second identifier 138 comprise a unique key or code that may not be replicated. This feature is primarily intended to prevent the first identifier 134 and/or second identifier 138 to become associated with multiple electronic vaping delivery units.

As shown in FIG. 2, the double-sided insert 130 is intended to be disposed on at least a portion of the container 120. For example, the double-sided insert 130 may be disposed on a surface 122 of the container 120. The illustrative embodiment of FIG. 2 shows a double-sided insert 130 being disposed on an outer surface 122 of a container 120. Thus, the surface 122 of the container 120, should comprise a sufficient dimension such that substantially the entirety of the double-sided insert 130 may be disposed thereon. As may also be appreciated from FIG. 2, when the double-sided insert 130 is disposed on the surface 122 of a container 120, the front side 132 of the double-sided insert 130 should face away from the surface 122 of the container 120, and the reverse side 136 of the double-sided insert 130 should face the surface 122 of the container 120. As such, the reverse side 136 of the double-sided insert 130 should be substantially concealed and the front side 132 of the double-sided insert 130 should be exposed. Thus, when the double-sided insert 130 is disposed on the container 120, not only should the reverse side 136 be substantially concealed, but the second identifier 138 should also be concealed. When the double-sided insert 130 is disposed on the container 120, the front side 132 of the double-sided insert 130 should be visible. Alternatively, an additional layer of a suitable material may be disposed on the front side 132 and/or the reverse side 136 of the double-sided insert 130 to conceal the first identifier 134 and/or the second identifier 138. Such additional layer may be configured such that it may remain on either the front side 132 or the reverse side 136 of the double-sided insert 130 until the user removes it. One additional layer may be provided to cover the front side 132 and another additional layer may be provided to cover the reverse side 136. For example, such an additional layer may be a sticker, decal, or similar layer that may temporarily conceal the first identifier 134 and/or the second identifier 138.

As shown in FIGS. 1A and 1B, the data network 110 is operatively configured with the device(s) 100 to authenticate an electronic vaping delivery unit. An operative communication between the data network 110 and the device(s) 100 may be enabled via one or more of the following: LAN, WAN, Serial, Z-WAVE, ZIGBEE, RS-485, MODBUS, BACNET, the Internet, or combinations thereof. Such operative communication may be facilitated over various wired and/or wireless modes including, but not limited to, interconnections by routers and/or gateways. Further, the data network 110 may be operatively configured with other hardware components and/or additional devices to facilitate and/or enable an operative communication with the device(s) 100. As a non-limiting example, an operative communication between data network 110 and the device(s) 100 may be enabled via a content delivery network (CDN).

The system 10 according to present invention may optionally comprise an application server with at least one computer having appropriate hardware and/or installed applications to enable server capabilities. Such server capabilities may include, but are not necessarily limited to, web services and/or other functional services to enable a remote access. The application server may comprise a general purpose computer(s), including one with a central processing unit (CPU), a specialized computer(s), or other hardware components structured to enable an operative communication between the data network 110 and the device(s) 100. Further, the application server may be cooperatively structured with executable and/or interpretable computer code. The application server may also be operatively configured with memory capabilities, including random-access memory, read-only memory, flash memory, and/or a primary memory. Further, the application server may also be configured with an electronic storage unit, secondary memory for storing data, and/or a communications interface. The application server may incorporate various solution stacks including, but not limited to, ZEND Server, APACHE Server, NODE.JS, ASP, PHP, Ruby, XAMPP, LAMP, WAMP, MAMP, WISA, LEAP, GLASS, LYME, LYCE, OpenStack, Ganeti, MEAN, MEEN, and XRX. Such solution or software stacks might be implemented with third-party cloud platforms, or without third-party cloud platforms, for example by implementing load balancing and/or virtualization software, such as provided by Citrix, Microsoft, VMware, Map-Reduce, Google Filesystem, Xen, memory caching software such as Memcached and Membase, structured storage software such as MySQL, MariaDB, and XtraDB. The solution stacks may also be deployed in cloud platforms by using development tools and server hosting services such as GitHub and Rackspace, and/or their equivalents. The application server may also comprise any combination of hardware and software, including code segments in any number of programmable, executable, or interpretable languages.

With reference again to FIGS. 1A and 1B, further features of the system 10 according to the present invention comprise providing a user interface 200. Generally, the user interface 200 is operatively linked to the device(s) 100 and is configured to implement various features of the present invention. The user interface 200 may be proprietary and may comprise a custom developed mobile or desktop application(s) and/or program(s) that may be installed, operated, or otherwise accessed via the device(s) 100. For example, the user interface 200 may be configured as an online portal or landing page that may be accessed by the user. The user interface 200 may be operatively configured with a web browser, mobile browser, or other application or executable code that enables user communication and/or visualization of information. Further, the user interface 200 may be accessible via wired LAN or Wi-Fi connection, or via Near-Field Communication (NFC) capabilities. It is within the scope of the present invention that the user interface 200 comprise various interactive features. For example, the user interface 200 may permit a user to create a profile such that the user may conveniently retrieve previously inputted and/or stored information. Additionally, the user may access the user interface 200 to receive and/or access discount offers, rewards, and/or savings programs. Additionally, it is within the scope of the present invention that companies, including manufacturers, distributors, and retailers, use the user interface 200 to access various features of the present invention. For example, such companies, may use the user 200 interface to access relevant information associated with purchasers. Such information may help such companies in the marketplace, for example in determining which customer rewards programs to offer, or in understanding purchasing patterns.

The user interface 200 and/or device(s) 100 may be cooperatively configured with executable or interpretable computer code and/or hardware to recognize the first identifier 134 and/or second identifier 138 and/or container 120. As used herein, the term "recognition" or "recognize", refer to a successful verification or corroboration that the first identifier 134 and/or second identifier 138 and/or container 120 is an appropriate match of a specific identifier assigned, container assigned or linked to a specific electronic vaping delivery unit. The user interface 200 may be configured so that a user may manually input a numeric code associated with the first identifier 134 and/or the second identifier 138. The user interface 200 and/or the device 100 may also be cooperatively configured with a scanner and/or other device capable of interpreting and/or obtaining information from a scannable element, such as, but not limited to a barcode. Examples of such scanners include portable scanners, bar code scanners, devices with cameras and/or scanning capabilities including, but not limited to, mobile devices, stationary scanners, desktop scanners, or other types of scanners. The user interface 200 may also be configured so that a user may image, using three-dimensional imaging, or video record, the container 120. The user interface 200 and/or the device 100 may also be cooperatively configured with a scanner and/or other device capable of interpreting and/or obtaining information from a container, by means of, but not limited to image recognition software and or object recognition software. Examples of such scanners include portable scanners, bar code scanners, devices with cameras and/or scanning capabilities including, but not limited to, mobile devices, stationary scanners, desktop scanners, or other types of scanners. Furthermore, the user interface 200 and/or device(s) 100 may be implemented via a computer program to recognize the first identifier 134 and/or second identifier 138 and/or container 120. For example, the user interface 200 and/or device(s) 100 may be implemented through a written program in a programmable or interpretable language, including but not limited to C, C++, C#, Ruby, Java, Dart, Rust, Swift, PHP, Perl, HTML, XHTML, and other equivalent languages.

Generally, the user interface 200 is configured to allow access to various features of the present invention upon a successful recognition of at least the first identifier 134. Alternatively, the user interface 200 may also be configured to allow access to the same or other features of the present invention upon a successful recognition of the second identifier 138. Further alternatively, the user interface 200 may also be configured to allow access to the same or other features of the present invention upon a successful recognition of the container 120. As used herein, a successful recognition of the first identifier 134 and/or the second identifier 138 and/or container 120 generally refers to successful recognition of a key, code or packaged enclosure that will allow a user access to various features of the present invention. Such a successful recognition may be enabled, for example, by using an operatively linked scanner, or mobile device with a camera, to scan and/or validate a bar code of the first identifier 134 and/or second identifier 138. Such a successful recognition may also be enabled, for example, by using an operatively linked scanner, or mobile device with a camera, to scan and/or validate the container 120. Alternatively, a user may directly input a numeric code, or a code comprising a combination of numerals, letters, and or other characters, to the user interface 200, for example, via the device(s) 100.

Features of the system 10 according to the present invention comprise using the user interface 200 to display data associated with the electronic vaping delivery unit upon a successful recognition of the first identifier 134 and/or second identifier 138 and/or container 120. As used herein, the first identifier 134 may be referred to as a "tracer" identifier or code. Upon a successful recognition primarily of the first identifier 134 or "tracer" code, the user interface 200 may display data associated with the electronic vaping delivery unit. Also upon a successful recognition of the container 120, the user interface 200 may display data associated with the electronic vaping delivery unit. In at least one alternative embodiment, the user interface 200 may display data associated with the electronic vaping delivery unit upon a successful recognition of the second identifier 138. For example, the user interface 200 may be configured to display data associated with the electronic vaping delivery unit. Thus, upon a successful recognition of the first identifier 134 and/or second identifier 138 and/or container 120, the user interface 200 may display information associated with the electronic vaping delivery unit that may assist the user in making a purchasing decision. Such displayed information associated with the electronic vaping delivery unit may comprise data relating to the location of origin of the product, the manufacturer, the date of manufacture, date of transport or shipment, and/or other data, such as, but not limited to, specific ingredients and quantities associated with the contents of the electronic vaping delivery unit. Upon a successful recognition of at least the first identifier 134, a user may access the user interface 200 to provide certain information, for example via the device(s) 100. In an alternative embodiment, a user may access the user interface 200 to provide such information after a successful recognition of the second identifier 138. For example, the information provided by the user may comprise information relating to the user or purchaser such as the individual's name, date of birth, gender, or purchasing preferences with respect to electronic vaping delivery units and related products. Such personal information may also comprise quantity and/or frequency of prior purchases of electronic vaping delivery units and related products. It is within the scope of the present invention that once the information provided by the user will be stored and will be accessible in the future. Such personal information may be stored in a repository or electronic database, which is shown as 140 in FIG. 1B. The repository or electronic database 140 may be created and/or updated by the user interface 200. The repository or electronic database 140 of information may be used for market research purposes, and may further assist manufacturers and distributors in identifying purchasing patterns and behaviors within customers.

As mentioned above, it is within the scope of the present invention to use the user interface 200 to retrieve and/or display information about the electronic vaping delivery unit that may assist in making a purchasing decision. It is generally intended that a user have access to the second identifier 138 after purchasing an electronic vaping delivery unit, which may be sold in a container 120. Accordingly, after purchasing an electronic vaping delivery unit, the user may expose the second identifier 138. For example, the double-sided insert 130 may be removed from the container 120 to expose the reverse side 136, also revealing the second identifier 138. Once exposed, the second identifier 138 may be recognized, again via a scan or other mobile device with a camera, or by inputting a key or a code onto the user interface 200. Upon a successful recognition of the second identifier 138, the user interface 200 may generate an authentication confirmation. Such authenticating confirmation may be sent to a user, for example via email or text message. By way of example, the present invention may implement mail transfer agents (MTA), mail delivery agents (MDA), and other computer software to send the authenticating confirmation to the user. Additionally, the user interface 200 may be configured to display the authentication confirmation, for example on the device(s) 100. Such authenticating information may comprise, without limitation, information relating to the manufacturer, distributor, and/or retailer of the electronic vaping delivery unit, or specific standards associated with the manufacture of the electronic vaping delivery unit. Upon a successful verification of the second identifier 138, the user interface 200 may also be configured to send a certificate of authenticity of the electronic vaping delivery unit, for example via email or text message. The authenticating confirmation may also give and/or send information to the application server that may further be used for analysis. Such analysis could include, but is not limited to, tracking and/or deducing associated attributes of any information given and/or sent for regulatory, business, or accounting purposes.

Further features of the present invention comprise procedures that are intended to reduce the risk of theft of information associated with the electronic vaping delivery unit. Such features include the user interface 200 being configured to invalidate the second identifier 138 upon a successful recognition of the second identifier 138. The user interface 200 may also be configured to invalidate the first identifier 134 upon a successful recognition of the second identifier 138. As used herein, "invalidate" or "inactivating" the second identifier 138 and/or first identifier 134 refer to an inactivation or otherwise dissolution of the second identifier 138 and/or first identifier 134. Inactivating the second identifier 138 and/or first identifier 134 upon a successful recognition of the second identifier is intended to prevent the unauthorized manufacture, including mass manufacture, of unauthorized replicas of an electronic vaping delivery unit. Additionally, inactivating the first identifier 134 and/or second identifier 138 is intended to lower the likelihood that the identifiers are replicated and used with products that are not authentic. Thus, once the second identifier 138 is recognized, the user interface 200 is generally configured to invalidate or dissolve the second identifier 138 and/or first identifier 134, such that such that they may not be used again in connection with a different electronic vaping delivery unit.

B. Overview of Method

Figure 4:
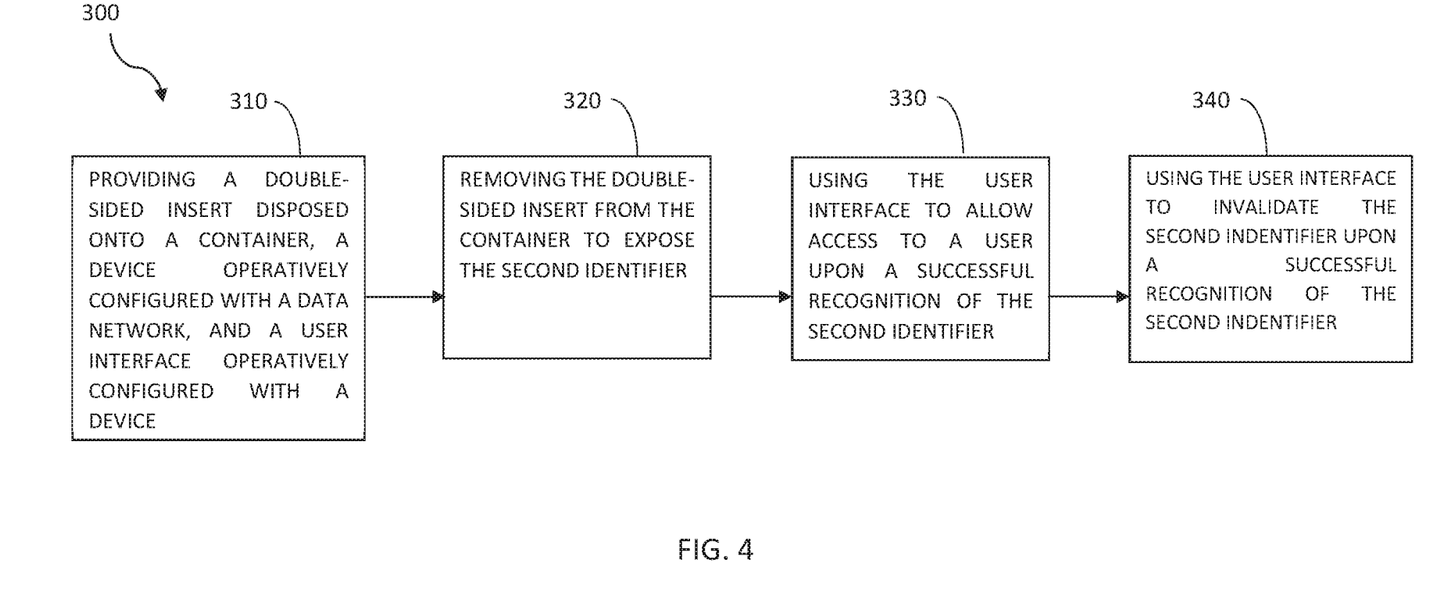
FIG. 4 is a flow chart representative of one illustrative embodiment of a method according to the present invention.
Figure 5:
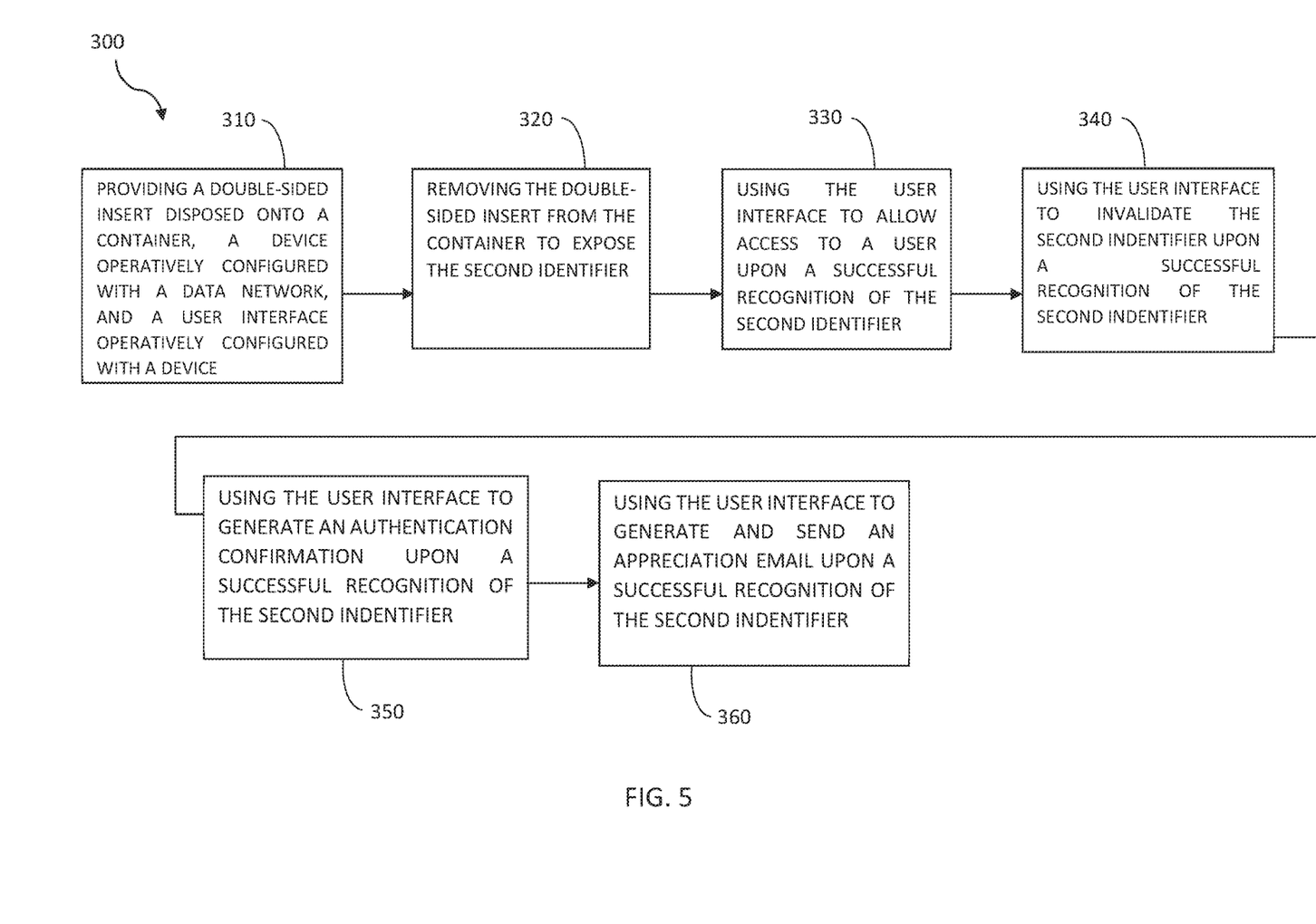
FIG. 5 is a flow chart representative of another illustrative embodiment of a method according to the present invention.

With reference to FIGS. 4-5, the present invention is also directed towards a method 300 of authenticating an electronic vaping delivery unit. As shown in FIG. 4 as 310, the inventive method 300 comprises providing a double-sided insert 130 disposed on a container 120, a device 100 operatively configured with a data network 110, a user interface 200 operatively linked to the device and configured to allow access to an individual. The double-sided insert 130 comprises a front side 132 and a reverse side 136; the front side 132 comprising a first identifier 134, and the reverse side 136 comprising a second identifier 138; the reverse side 136 disposed on a surface 122 of the container 120 and the second identifier 138 being concealed. As shown in FIG. 4 as 320, the method 300 comprises removing the double-sided insert 130 from the container 120 such that the second identifier 138 is exposed.

As shown in FIG. 4 as 330, the method 100 according to the present invention further comprises using the user interface 200 to allow access to a user upon a successful recognition of the second identifier 138. As shown in FIG. 5 as 340, the method 300 of the present invention may further comprise using the user interface 200 to invalidate the second identifier 138 upon a successful recognition of the second identifier 138. Alternatively, the method 300 of the present invention may further comprise invalidating the first identifier 134 upon a successful recognition of the second identifier 138. As represented in FIG. 5 as 350, the method 300 may further comprise using the user interface 200 to generate an authentication confirmation upon a successful recognition of the second identifier 138. This may further comprise using the user interface 200 to generate and send an appreciation email upon a successful recognition of the second identifier 138. As represented in FIG. 5 as 360, the method 300 may further comprise using the user interface 200 to generate and send an appreciation email upon a successful recognition of the second identifier 138.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for authenticating an electronic vaping delivery unit, said system comprising:
a double-sided insert disposable onto a container, said double-sided insert comprising a front side and a reverse side,
said front side comprising a first identifier and said reverse side comprising a second identifier,
said reverse side disposed on a surface of the container and said second identifier concealed, when said double-sided insert is disposed onto the container,
said second identifier exposed when said double-sided insert is removed from the container,
a device operatively configured with a data network,
a user interface operatively linked to said device,
said user interface configured to allow access to a user upon a successful recognition of said first identifier by said device, and
said user interface configured to generate an authentication confirmation upon a successful recognition of said second identifier.

2. The system as recited in claim 1 wherein at least said second identifier is unique to the electronic vaping delivery unit.

3. The system in claim 1 wherein said user interface configured to provide access to a user and display data associated with the electronic vaping delivery unit upon a successful recognition of the container.

4. The system as recited in claim 1 wherein said user interface is configured to invalidate said second identifier upon said successful recognition of said second identifier.

5. The system as recited in claim 1 wherein said user interface is configured to invalidate said first identifier upon a successful recognition of said second identifier.

6. The system as recited in claim 1 wherein said user interface is configured to display data associated with the electronic vaping delivery unit upon a successful recognition of said first identifier.

7. The system as recited in claim 1 wherein said user interface is configured to send an authentication confirmation upon a successful recognition of said second identifier.

8. The system as recited in claim 1 wherein said first identifier comprises a scannable element.

9. The system as recited in claim 1 wherein said first identifier comprises a numeric code.

10. The system as recited in claim 1 wherein said second identifier comprises a scannable element.

11. The system as recited in claim 1 wherein said second identifier comprises a numeric code.

12. The system as recited in claim 1 wherein said user interface is structured to obtain information from the user.

13. The system as recited in claim 12 wherein said user interface is structured to create an electronic database based on said information obtained from the user.

14. The system as recited in claim 13 wherein said user interface is structured to interpret said information obtained from the user to determine purchasing patterns of the user.

15. A system for authenticating an electronic vaping delivery unit, said system comprising:
a double-sided insert disposable onto a container, said double-sided insert comprising a front side and a reverse side,
said front side comprising a first identifier and said reverse side comprising a second identifier,
said reverse side disposed on a surface of the container and said second identifier concealed, when said double-sided insert is disposed on the container,
said second identifier exposed when said double-sided insert is removed from the container,
a device operatively configured with a data network,
a user interface operatively linked to said device,
said user interface configured to allow access to a user and display data associated with the electronic vaping delivery unit upon a successful recognition of said first identifier, said user interface configured to generate and send an authentication confirmation upon a successful recognition of said second identifier, and said user interface configured to invalidate said second identifier upon successful recognition of said second identifier.

16. The system in claim 15 wherein said user interface configured to provide access to a user and display data associated with the electronic vaping delivery unit upon a successful recognition of the container.

17. A method for authenticating an electronic vaping delivery unit, the method comprising:
providing:
a double-sided insert disposed on a container, the double-sided insert comprising:
a front side and a reverse side,
the front side comprising a first identifier and the reverse side comprising a second identifier, the reverse side disposed on a surface of the container and the second identifier concealed,
a device operatively configured with a data network,
a user interface operatively linked to the device and configured to allow access to a user, removing the double-sided insert from the container, such that the second identifier is exposed,
using the user interface to allow access to the individual upon a successful authentication of the first identifier, and
using the user interface to generate an authentication confirmation upon a successful recognition of the second identifier.

18. The method as recited in claim 17 further comprising:
using the user interface invalidate the second identifier upon a successful recognition of the second identifier.

19. The method as recited in claim 17 further comprising using said user interface configured to provide access to a user and displaying data associated with the electronic vaping delivery unit upon a successful recognition of the container.

20. The method as recited in claim 17 further comprising using said user interface to send the authentication confirmation upon the successful recognition of the second identifier.

21. The method as recited in claim 15 further comprising using the user interface to generate and send an appreciation email upon the successful recognition of the second identifier.

22. The method as recited in claim 21 further comprising using the user interface to send said appreciation email upon the successful recognition of the second identifier.

* * * * *